United States Patent
Hustava et al.

(10) Patent No.: US 11,982,740 B2
(45) Date of Patent: May 14, 2024

(54) MOTION-COMPENSATED DISTANCE SENSING WITH CONCURRENT UP-CHIRP DOWN-CHIRP WAVEFORMS

(71) Applicant: SEMICONDUCTOR COMPONENTS INDUSTRIES, LLC, Phoenix, AZ (US)

(72) Inventors: Marek Hustava, Bratislava (SK); Tomas Suchy, Brno (CZ); Pavel Kostelnik, Bordovice (CZ); Dalibor Bartos, Troubsko (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

(21) Appl. No.: 17/821,497

(22) Filed: Aug. 23, 2022

(65) Prior Publication Data

US 2024/0069192 A1 Feb. 29, 2024

(51) Int. Cl.
*G01S 15/58* (2006.01)
*G01S 15/931* (2020.01)

(52) U.S. Cl.
CPC .............. *G01S 15/58* (2013.01); *G01S 15/931* (2013.01); *G01S 2015/932* (2013.01)

(58) Field of Classification Search
CPC .... G01S 15/58; G01S 15/93; G01S 2015/932; G01S 15/931; G01S 2015/933; G01S 2015/936; G01S 2015/935; G01S 2015/934; G01S 2015/937; G01S 2015/938; G01S 2015/939; G01S 15/88; G01S 15/87; G01S 15/874; G01S 15/876; G01S 15/582; G01S 15/588; G01S 15/60; G01S 15/62;

(Continued)

(56) References Cited

U.S. PATENT DOCUMENTS 3,142,033 A * 7/1964 Flowers .................. F42B 19/01
367/901
3,690,153 A * 9/1972 Matay .................... G01N 29/30
73/631

(Continued)

FOREIGN PATENT DOCUMENTS

EP 1231481 A2 8/2002

*Primary Examiner* — Daniel L Murphy
*Assistant Examiner* — Amie M Ndure
(74) *Attorney, Agent, or Firm* — Ramey LLP (57) ABSTRACT

Various sensors, sensor controllers, and sensing methods are suitable for use in a multi-channel ultrasonic sensor array such as those used in systems for parking assistance, blind spot monitoring, and driver assistance. One illustrative acoustic sensing method includes: driving an acoustic transducer to send acoustic bursts each including an up-chirp in a first frequency band and a down-chirp in a second frequency band; receiving echo signals responsive to the acoustic bursts from the transducer; and using the echo signals to determine a distance or time of flight from the transducer. Another acoustic sensing method includes: driving an acoustic transducer to send acoustic bursts each including a concurrent up-chirp and down-chirp; receiving echo signals responsive to the acoustic bursts from the transducer; and using the echo signals to determine a distance or time of flight from the transducer.

20 Claims, 5 Drawing Sheets

(58) Field of Classification Search
CPC .... G01S 15/586; G01S 15/8913; G01S 15/46; G01S 13/76
USPC ......................................................... 367/118
See application file for complete search history.

(56) References Cited

U.S. PATENT DOCUMENTS

| | | | | |
|---|---|---|---|---|
| 3,976,968 | A | * | 8/1976 | Slaton ..................... G01S 15/52 367/95 |
| 5,805,526 | A | * | 9/1998 | Pelick ..................... G01S 7/527 367/97 |
| 7,114,091 | B2 | * | 9/2006 | Vrancic ................. H04J 3/0664 713/400 |
| 10,663,568 | B2 | | 5/2020 | Suchy et al. |
| 2003/0177154 | A1 | * | 9/2003 | Vrancic ..................... G06F 1/12 708/160 |
| 2005/0004461 | A1 | * | 1/2005 | Abend ................ G01S 7/52074 600/437 |
| 2016/0154104 | A1 | | 6/2016 | Schumann et al. |
| 2018/0031701 | A1 | | 2/2018 | Hustava et al. |
| 2018/0203095 | A1 | * | 7/2018 | Xie ......................... G01S 7/023 |
| 2019/0025415 | A1 | * | 1/2019 | Suchy ................... G01S 15/931 |
| 2022/0187451 | A1 | * | 6/2022 | Hustava ................. G01S 15/10 |

* cited by examiner

MOTION-COMPENSATED DISTANCE SENSING WITH CONCURRENT UP-CHIRP DOWN-CHIRP WAVEFORMS

BACKGROUND

Modern automobiles are equipped with an impressive number and variety of sensors. For example, cars are now routinely equipped with arrays of ultrasonic sensors to monitor the distance between the car and any nearby persons, pets, vehicles, or obstacles. Due to environmental "noise" and safety concerns, each of the sensors may be asked to provide tens of measurements each second while the car is in motion. It is important for such sensor arrays to perform reliably.

As the number of sensors increases, so too does the need for the sensors to operate concurrently, increasing the risk of interference between the sensors. Because acoustic bursts from multiple sensors may be "in flight" at the same time, the echoes from bursts by a first sensor may be detected by other sensors and become erroneously associated with other bursts, leading to incorrect time-of-flight determinations and erroneous distance measurements.

This issue is at least partially addressed by the sensors and methods of U.S. Pat. No. 10,663,568 "Composite acoustic bursts for multi-channel sensing", naming as inventors T. Suchy, M. Kassa, M. Hustava, which teaches the use of multiple frequency bands to provide the acoustic bursts with source-specific signatures, and which is hereby incorporated herein by reference. Yet there remains room for further improvements, particularly in regards to velocity measurement and motion compensation, which heretofore has not been achievable in a multi-channel system with a high measurement rate.

SUMMARY

Accordingly, there are disclosed herein various sensors, sensor controllers, and sensing methods suitable for use in a multi-channel ultrasonic sensor array such as those used in systems for parking assistance, blind spot monitoring, and driver assistance. One illustrative an acoustic sensing method includes: driving an acoustic transducer to send acoustic bursts each including an up-chirp in a first frequency band and a down-chirp in a second frequency band; receiving echo signals responsive to the acoustic bursts from the transducer; and using the echo signals to determine a distance or time of flight from the transducer.

Another acoustic sensing method includes: driving an acoustic transducer to send acoustic bursts each including a concurrent up-chirp and down-chirp; receiving echo signals responsive to the acoustic bursts from the transducer; and using the echo signals to determine a distance or time of flight from the transducer.

An illustrative sensor controller includes: a transmitter that couples to an acoustic transducer to send acoustic bursts each including an up-chirp in a first frequency band and a down-chirp in a second frequency band; a receiver that couples to the acoustic transducer to receive echo signals responsive to the acoustic bursts; and a processor that derives a distance or time of flight from the echo signals.

Another illustrative sensor controller includes: a transmitter that drives an acoustic transducer to send acoustic bursts each including a concurrent up-chirp and down-chirp; a receiver that couples to the acoustic transducer to receive echo signals responsive to the acoustic bursts; and a processor that operates on the echo signals to determine a distance or time of flight from the transducer.

Each of the foregoing embodiments may be employed individually or conjointly, and they may further employ one or more of the following optional features in any suitable combination: 1. each of the acoustic bursts includes the up-chirp superimposed with the down-chirp. 2. the first and second frequency bands are non-overlapping. 3. the acoustic transducer supports multiple options for at least one of the first and second frequency bands to provide a source-specific signature for the acoustic bursts that enables self-generated echo signals to be distinguished from echo signals concurrently generated from other sources. 4. the first frequency band is a center band supported by the acoustic transducer. 5. the second frequency band is an upper band or a lower band supported by the acoustic transducer. 6. determining the distance or time of flight includes: correlating the echo signals with a center band up-chirp and at least one of a lower band down-chirp and an upper band down-chirp; detecting arrival times associated with up-chirp and down-chirp correlation peaks; and combining the arrival times to estimate a Doppler shift or relative velocity of a target. 7. said determining further includes adjusting the arrival time associated with the up-chirp based on the Doppler shift or relative velocity of the target.

DETAILED DESCRIPTION

It should be understood that the following description and accompanying drawings are provided for explanatory purposes, not to limit the disclosure. In other words, they provide the foundation for one of ordinary skill in the art to understand all modifications, equivalents, and alternatives falling within the scope of the claims.

Figure 1:
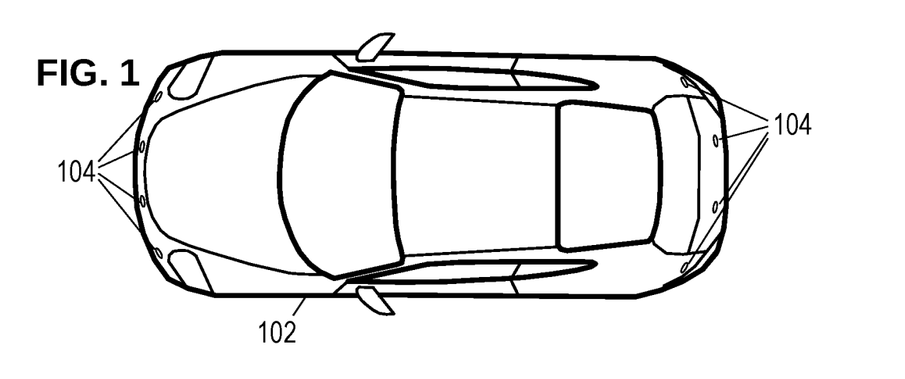
FIG. 1 is an overhead view of an illustrative vehicle equipped with parking-assist sensors.

To provide context, FIG. 1 shows an illustrative vehicle 102 equipped with a set of ultrasonic parking-assist sensors 104. The number and configuration of sensors in the sensor arrangement varies, and it would not be unusual to have six sensors on each bumper with two additional sensors on each side for blind-spot detectors on each side. The vehicle may employ the sensor arrangement for detecting objects in the various detection zones, measuring their distances, directions, and motions, using the sensors for individual measurements as well as cooperative (e.g., triangulation, multi-receiver) measurements.

The ultrasonic sensors are preferably transceivers, meaning that each sensor can transmit and receive bursts of ultrasonic sound. Emitted bursts propagate outward from the vehicle until they encounter and reflect from an object or some other form of acoustic impedance mismatch. The reflected bursts return to the vehicle as "echoes" of the emitted bursts. The times between the emitted bursts and received echoes are indicative of the distances to the reflection points. If the object is moving relative to the vehicle, that motion introduces a Doppler shift that can be indicative of the object's velocity. In many systems, only one sensor transmits at a time, though all of the sensors may be configured to measure the resulting echoes. However, the present disclosure provides a way to support multiple simultaneous transmissions through the use of multi-band operation to provide the acoustic bursts with distinctive, source-specific signatures.

Figure 2:
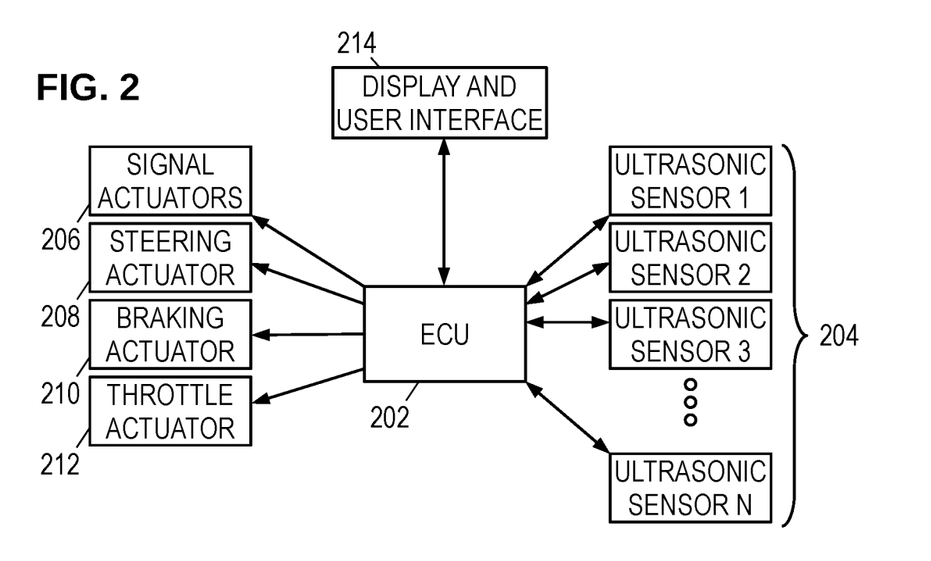
FIG. 2 is a block diagram of an illustrative parking assist system.

FIG. 2 shows an electronic control unit (ECU) 202 coupled to the various ultrasonic sensors 204 as the center of a star topology. Of course, other topologies including serial, parallel, and hierarchical (tree) topologies, are also suitable and contemplated for use in accordance with the principles disclosed herein. To provide automated parking assistance, the ECU 202 may further connect to a set of actuators such as a turn-signal actuator 206, a steering actuator 208, a braking actuator 210, and throttle actuator 212. ECU 202 may further couple to a user-interactive interface 214 to accept user input and provide a display of the various measurements (including the presence of, and/or distance to, nearby objects) and system status. Using the interface, sensors, and actuators, ECU 202 may provide automated parking, assisted parking, lane-change assistance, obstacle and blind-spot detection, collision avoidance, and other desirable features.

One potential sensor configuration is now described with reference to FIGS. 3 and 4. In practice, the sensors may employ any of a number of suitable communication and power supply techniques such as those provided in the DSI3, LIN, and CAN standards. Some of these standards support data communication via the power conductors, or via multiple bus conductors. However, in the illustrated embodiment of FIG. 3, the sensor controller 302 connects only to two power terminals (Vbat and GND) and a single input/output ("I/O" or "IO") line for bidirectional communication with the ECU 202.

The sensor controller 302 includes an I/O interface 303 that, when placed in a recessive mode, monitors the I/O line for communication from the ECU 202 and, when placed in a dominant mode, drives the I/O line to send measurements or other information to the ECU 202.

The sensor controller 302 includes a core logic 304 that operates in accordance with firmware and parameters stored in nonvolatile memory 305 to parse commands from the ECU and carry out the appropriate operations, including the transmission and reception of ultrasonic bursts. To transmit an ultrasonic burst, the core logic 304 is coupled to a transmitter 306 which drives a set of transmit terminals on the sensor controller 302. The transmitter terminals are coupled via a transformer M1 to a piezoelectric element PZ. The transformer M1 steps up the voltage from the sensor controller (e.g., 12 volts) to a suitable level for driving the piezoelectric element (e.g., tens of volts). The piezoelectric element PZ has a resonance frequency that is tuned to a desirable value (e.g., 48 kHz) with a parallel capacitor C3, and has a resonance quality factor (Q) that is tuned with a parallel resistor R1. One illustrative purpose of the tuning capacitor and tuning resistor is to tune the parallel resonance frequency close to the series resonant frequency of the piezoelectric element. (Though an ultrasonic frequency is provided here as an example, any acoustic frequency suitable for burst propagation may be employed.)

As used herein, the term "piezoelectric transducer" includes not only the piezoelectric element, but also the supporting circuit elements for driving, tuning, and receiving from, the piezoelectric element. In the illustrative embodiment, these supporting elements are the transformer M1, the tuning resistor and tuning capacitor, and the DC-isolation capacitors. Optionally, output and input capacitance of the transmitter 306 and amplifier 308, respectively, may also be included as parasitic characteristics of the supporting circuit elements considered to be part of the transducer. However, the use of the term "piezoelectric transducer" does not necessarily require the presence of any supporting circuit elements, as a piezoelectric element may be employed alone without such supporting elements.

A pair of DC-isolation capacitors C1, C2 couple the piezoelectric element to the sensor controller's pair of receive terminals to protect against high voltages. Further protection is provided with internal voltage clamps on the receive terminals. Such protection may be desired for the intervals when the piezoelectric element is transmitting. As the received echo signals are typically in the millivolt or microvolt range, a low-noise amplifier 308 amplifies the signal from the receive terminals. The amplified receive signal is digitized and processed by a digital signal processor (DSP) 310 with an integrated analog-to-digital converter (ADC).

DSP 310 applies programmable methods to measure the actuation period of the piezoelectric transducer during the transmission of a burst (including the ensuing reverberation or "ringing" period), and to detect and measure the timing of any received bursts or "echoes". Such methods may employ filtering, correlation, threshold comparisons, minimum intervals, peak detections, zero-crossing detection and counting, noise level determinations, and other customizable techniques tailored for improving reliability and accuracy. The DSP 310 may further process the amplified receive signal to analyze characteristics of the transducer, such as resonance frequency and quality factor, and may further detect transducer fault states.

Some fault states may be indicated by, e.g., an excessively short actuation period (which may be due to a disconnected or defective transducer, suppressed vibration, or the like), while others may be indicated by an excessively long actuation period (defective mounting, inadequate damping resistance, or the like). In addition to the transducer fault states that may be detected by the DSP 310, the core logic may monitor other sensor error conditions such as having the supply voltage "under-voltage" or "over-voltage" while transmitting an ultrasonic burst, thermal shutdown of transmitter, a hardware error, an incomplete power-on reset, or the like. The core logic 304 may detect and classify multiple such transducer fault states and error conditions, storing the appropriate fault codes in internal registers or nonvolatile memory 305. Commands received via the I/O line trigger the core logic 304 to operate the transmitter and receiver and provide the measurement results to the ECU 202 via the I/O line, potentially accompanied by status bits or fault codes.

Figure 4:
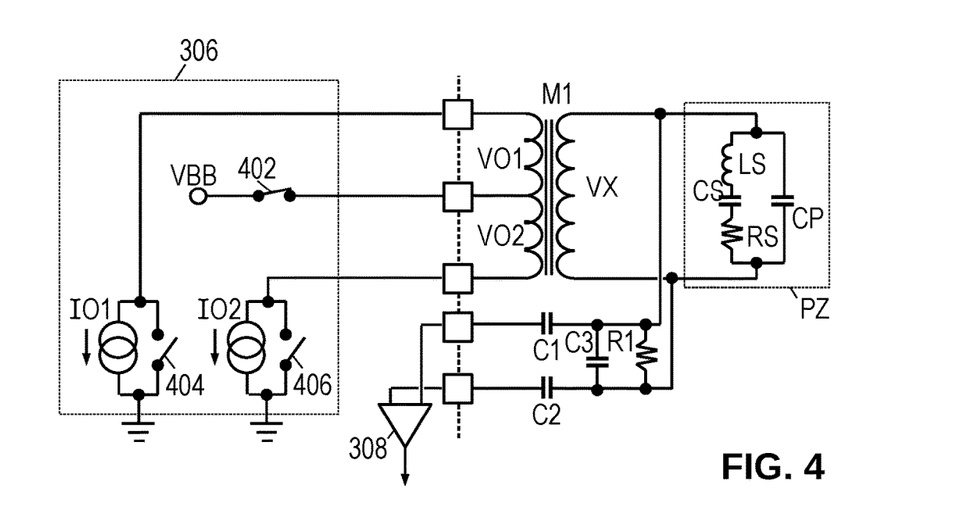
FIG. 4 is an equivalent circuit schematic with illustrative transmitter detail.

FIG. 4 is a circuit schematic in which the piezoelectric element PZ is replaced by an equivalent circuit representation of a parallel capacitor CP coupled in parallel with a series combination of a series inductor LS, a series capacitor CS, and a series resistor RS. The series combination represents mechanical action of the piezoelectric element, with RS representing the element's energy loss (which during normal operation is primarily due to the radiated acoustic energy). FIG. 4 also provides additional detail for an illustrative implementation of transmitter 306.

During the driving stage of transmitting an acoustic burst, switch 402 is closed, coupling a supply voltage VBB to a center tap on the primary of transformer M1. Current sources 101 and 102 alternately drive current in opposite directions from the center tap to the end taps on the primary of transformer M1, producing an alternating voltage VX on the secondary of transformer M1. The secondary voltage VX is coupled to the terminals of piezoelectric element PZ. Note that the turn ratio of the transform M1 makes the alternating secondary voltage VX directly proportional to the sum of primary winding voltages VO1 and VO2. Consequently, the voltage between the terminals of the piezoelectric element can be determined by measuring the voltages on primary windings, though in the discussion below the measurement is described as being made across the secondary winding.

When the driving stage of transmitting an acoustic burst is complete, switch 402 is opened. The piezoelectric transducer will continue to reverberate after the driving stage, with a gradual decay of the reverberation amplitude. It is often desired to minimize the length of this reverberation stage, and accordingly a number of damping techniques may be employed as described in the public literature. In the illustrated implementation, switches 404 and 406 are closed, effectively "shorting" the transducer by creating a low-impedance path between the taps of the transformer primary. Once the reverberation is adequately damped, switches 404 and 406 may be opened to enable amplifier 308 to begin collecting signal measurements.

When multiple sensors operate in parallel, multiple acoustic bursts may be transmitted concurrently. Sensors actively listening for echoes may receive not only self-generated echo signals, but also echoes caused by bursts from other sensors. To enable each sensor to distinguish self-generated echoes from potentially interfering echoes from other sources, the sensors preferably generate their bursts with distinctive signatures.

Figure 5:
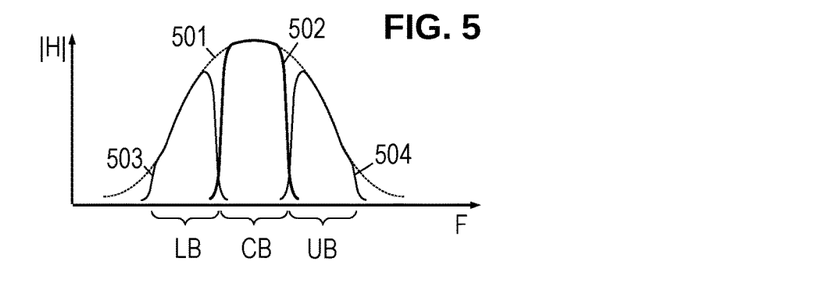
FIG. 5 is a graph of an illustrative passband divided into three parts.

FIG. 5 is a graph of a passband 501 for an illustrative piezoelectric transducer. In at least some embodiments, the 3 dB width of the passband is approximately 6 kHz. (The center frequency varies, and may typically reside in the 25 kHz to 75 kHz range.) The passband may be divided into bands, including a center band (CB) that is centered within the passband 501 and occupies about half of it, i.e., accommodating a signal spectrum 502 with a 3 dB bandwidth of approximately 3 kHz. A lower band (LB) may be centered at the lower 3 dB point of the passband 501, so that the passband accommodates an upper sideband of a signal spectrum 503 with adequate separation from the CB spectrum 502. Similarly, an upper band (UB) may be centered at the upper 3 dB point of the passband, so that the passband 501 accommodates a lower sideband of a signal spectrum 504, again with adequate separation from the CB spectrum 502. (At least some band separation is desired to allow for Doppler shifts due to motion of the sensors.) Each of the spectra 502, 503, 504 may initially have the same nominal 3 kHz bandwidth, though the passband's unbalanced attenuation is expected to distort the signal spectra in the upper and lower bands.

Each of the sensors may primarily rely on the acoustic burst energy in the center band to capture time of flight measurements, employing the presence or absence of energy in the upper and lower bands to distinguish the bursts by source.

Certain contemplated sensor embodiments employ multi-chirp waveforms for the acoustic bursts. Chirp waveforms have a frequency that varies during the duration of the burst. In an up-chirp, the frequency increases as a function of time, whereas in a down-chirp, the frequency decreases as a function of time. Linear chirps, i.e., those waveforms have a frequency that varies linearly with time, have a characteristic behavior when reflecting from a moving object. A moving object causes a reflected chirp to exhibit a frequency shift due to the Doppler effect. Objects moving toward the sensor shift the chirp frequency upward, whereas objects receding from the sensor shift the chirp frequency downward. If the object's velocity is small relative to the speed of sound, the change in frequency is approximately proportional to the velocity v:

$$\Delta f \cong v \frac{f_0}{c}$$

where $f_0$ is the frequency of the incident waveform and c is the speed of sound. (Often, the change in chirp frequency is small relative to the average frequency of the chirp, enabling an accurate approximation even if $f_0$ is treated as a constant.) Because the chirp frequency varies linearly with time, the sensor detects the frequency shift as a shift in the arrival time of the echo signal:

$$\Delta t = -\Delta f \frac{T}{B} \cong -v \frac{f_0}{c} \frac{T}{B}$$

where B is the bandwidth of the chirp and T is the duration of the chirp, such that B/T is the slope of the linear frequency variation for the up-chirp. Thus an object moving towards the sensor causes "early" detection of the echo, potentially causing the object to appear closer than it actually is. The slope of frequency change for the down-chirp is negative, causing a positive time shift which translates to a "late" detection of the echo such that the object may appear farther away than it actually is.

When a waveform combines an up-chirp with a down-chirp, this characteristic behavior enables the sensor to estimate the relative velocity of a target and to provide a motion-compensated distance measurement. If the up-chirp and down-chirp slopes have equal magnitude, the sensor can determine a travel time $t_u$ for the up-chirp, a travel time td for the down-chirp and subtract them to obtain the time shift and associated object velocity:

$$t_u - t_d = 2 \Delta T \cong -2 v \frac{f_0}{c} \frac{T}{B}$$

The coefficient will be different if the up-chirp and down-chirp slopes are not equal. Having determined the time shift, the sensor can then combine it with the measured travel time to obtain a motion-compensated distance D:

$$D = c(t_u - \Delta t)$$

Figure 6A:
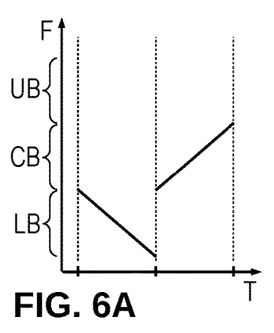
FIGS. 6A-6I show illustrative multi-chirp waveform arrangements.
Figure 6B:
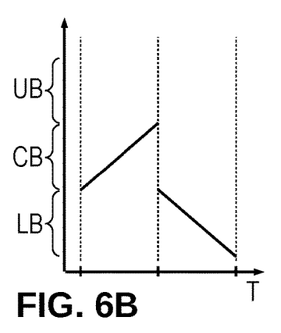
Figure 6C:
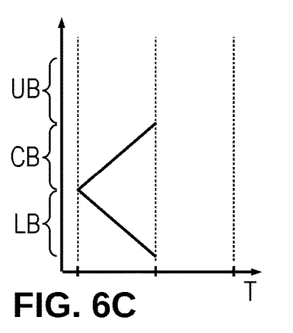

FIGS. 6A-6I show illustrative multi-chirp waveforms that may be employed to generate acoustic bursts that enable use of the foregoing principles. FIG. 6A shows a waveform having a lower band down-chirp preceding a center band up-chirp. This order is reversed in FIG. 6B, with the center band up-chirp preceding the lower band down-chirp. Preferably, however, the center band up-chirp is sent concurrently with the lower band down-chirp as shown in FIG. 6C.

While halving the duration of the acoustic burst, this concurrent transmission causes the chirp waveforms to be superimposed, potentially doubling the waveform amplitude. Doubling the waveform amplitude can potentially saturate the transducer, causing nonlinear effects and other undesirable behavior. It has been found that the individual chirp waveforms can be limited to half of the maximum signal magnitude while still achieving the desired sensor range and accuracy in early testing, such that the superposition of the chirp waveforms does not exceed the maximum signal amplitude. Thus, for example, if the maximum transmitter drive current is 500 mA, the individual chirp signals may each be limited to 250 mA. It is further noted that the shorter burst improves measurement performance at short distances, and reduces power dissipation on the chip, enabling faster measurement repetition (reduced time between measurements).

Figure 6D:
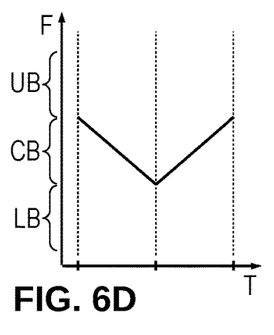
Figure 6E:
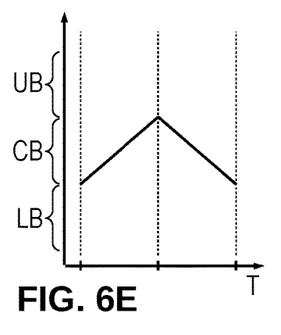
Figure 6F:
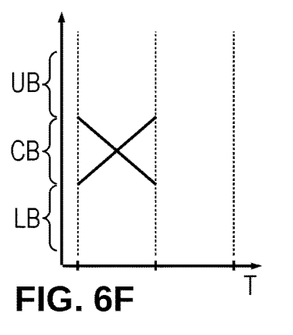

FIG. 6D shows a waveform having a center band down-chirp preceding a center band up-chirp, and the order is reversed in FIG. 6E. FIG. 6F shows a waveform having concurrently transmitted up-chirp and down-chirp in the center band, achieving a desirable halving of the acoustic burst duration. It is noted that because the up-chirp and down-chirp share the same frequency band, they cannot be separated with bandpass filtering, without which the measurements may exhibit increased cross-talk due to the limited transducer bandwidth.

Figure 6G:
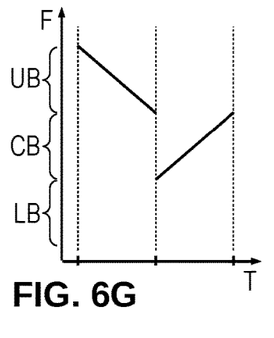
Figure 6H:
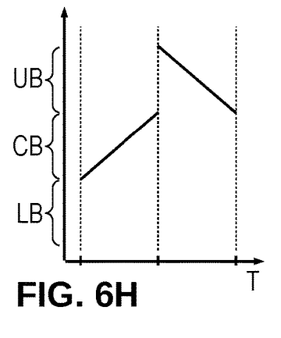
Figure 6I:
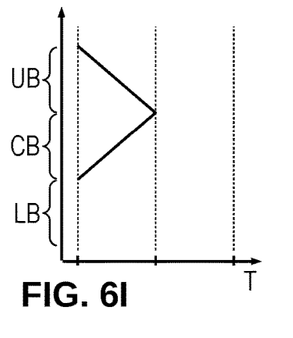

FIG. 6G shows an upper band down-chirp preceding a center band up-chirp, while FIG. 6H reverses their order. FIG. 6I shows concurrent transmission of the upper band down-chirp with the center band up-chirp. Bandpass filtering enables excellent separation of the up-chirp and down-chirp responses.

Each of the waveforms shown in FIGS. 6A-6I include a center band up-chirp. The placement of the down-chirp (low band, center band, upper band) enables the acoustic bursts from different sources to be distinguished. We note that the center band can alternatively or additionally used for a down-chirp in combination with an up-chirp in one of the other bands. Safety considerations may suggest a preference for the use of a center band up-chirp, as the up-chirp enables early warning of approaching objects in the band that provides more reliable detection and better range.

Figure 3:
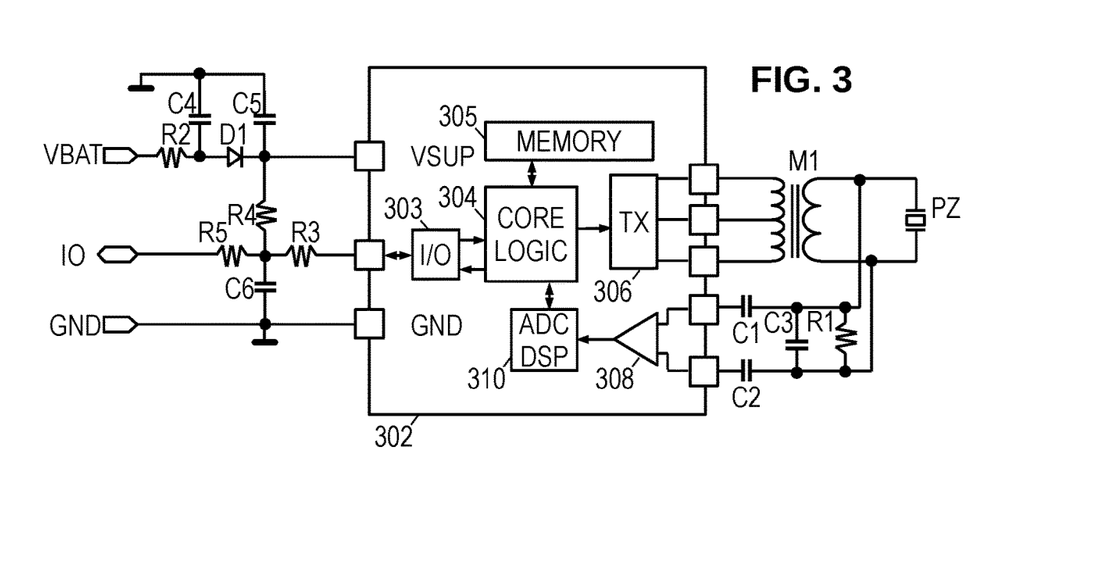
FIG. 3 is a circuit schematic of an illustrative parking-assist sensor.
Figure 7:
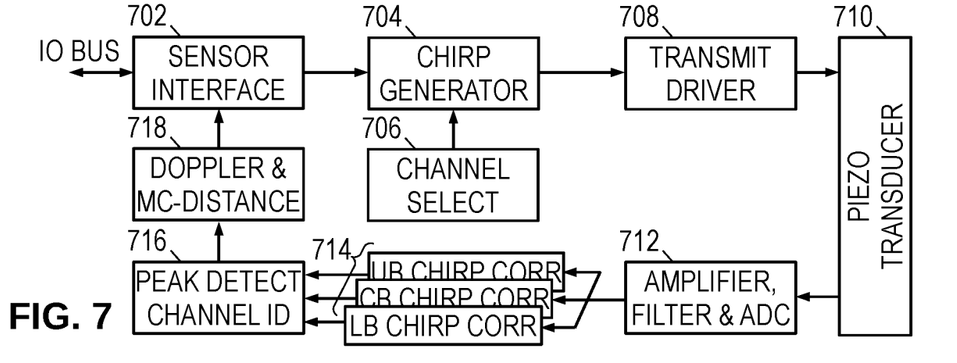
FIG. 7 is a function block diagram of an illustrative sensor.

To exploit the foregoing principles, the core logic & DSP circuitry of FIGS. 3-4 may implement a series of function blocks such as those shown in FIG. 7. A sensor interface 702 communicates with a system controller to receive commands, initiate measurements, and communicate measurement results. When a measurement is initiated, a chirp generator 704 creates one of the foregoing multi-chirp waveform signals selected by a channel select register 706, which specifies which specifies the frequency bands used by the sensor and the order or superposition of the up-chirp and down-chirp. The generator 704 provides the selected multi-chirp waveform signal to a transmit driver 708, which drives the acoustic transducer 710 to create an acoustic burst having the selected source-specific signature. As the acoustic transducer 710 receives echoes, a receiver circuit 712 amplifies, filters, and digitizes the receive signal. A set of correlators 714 operate on the digitized receive signal to provide correlation peaks when the receive signal includes a lower band down-chirp, center band up-chirp, and/or upper band down-chirp. A peak detector 716 detects the arrival time or time of flight for any correlation peaks above a programmable threshold, and may optionally filter out any peaks that do not match the relationship specified by the channel select register, e.g., a superimposed up-chirp and down-chirp waveform, as such peaks are not from self-generated echoes. Alternative embodiments may instead employ an edge detector or some variation thereof to determine arrival time or time of flight. Some contemplated embodiments provide measurements for peak combinations matching different source signatures being used within the system.

A signal processor 718 combines the up-chirp and down-chirp times to determine at least the time shift and potentially the associated Doppler shift or corresponding velocity of the target. The measurement circuit further determines a distance to the target, preferably combining the time shift with the time of flight derived from the up-chirp to ensure the distance measurement is motion compensated. The signal processor 718 may combine sequential measurements to increase accuracy. Interface 702 communicates the measurements to the system controller.

Figure 8:
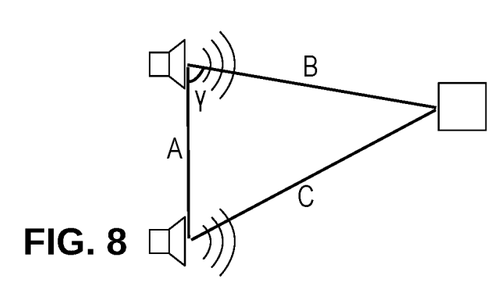
FIG. 8 is a sketch of geometry for target triangulation.

In another contemplated embodiment, the correlator outputs are provided to an ECU, which provides additional signal processing to improve reliability (e.g., noise suppression) and combines measurements from multiple channels to increase flexibility (e.g., by enhancing channel separation, or triangulating to determine obstacle position). FIG. 8 shows an illustrative geometry for triangulation, with A representing the distance between acoustic sensors, B and C representing the distances measured by the first and second sensors, and y representing the direction of the target from the first sensor. Upon receiving distance measurements from each of the sensors, the ECU can calculate the target direction from the first sensor as:

$$\gamma = \cos^{-1}\left(\frac{A^2 + B^2 - C^2}{2AB}\right)$$

A similar computation provides the direction from the second sensor. With these directions, the ECU can further combines the velocities measured by the two sensors to determine a two-dimensional target velocity relative to the vehicle. ##

Figure 9:
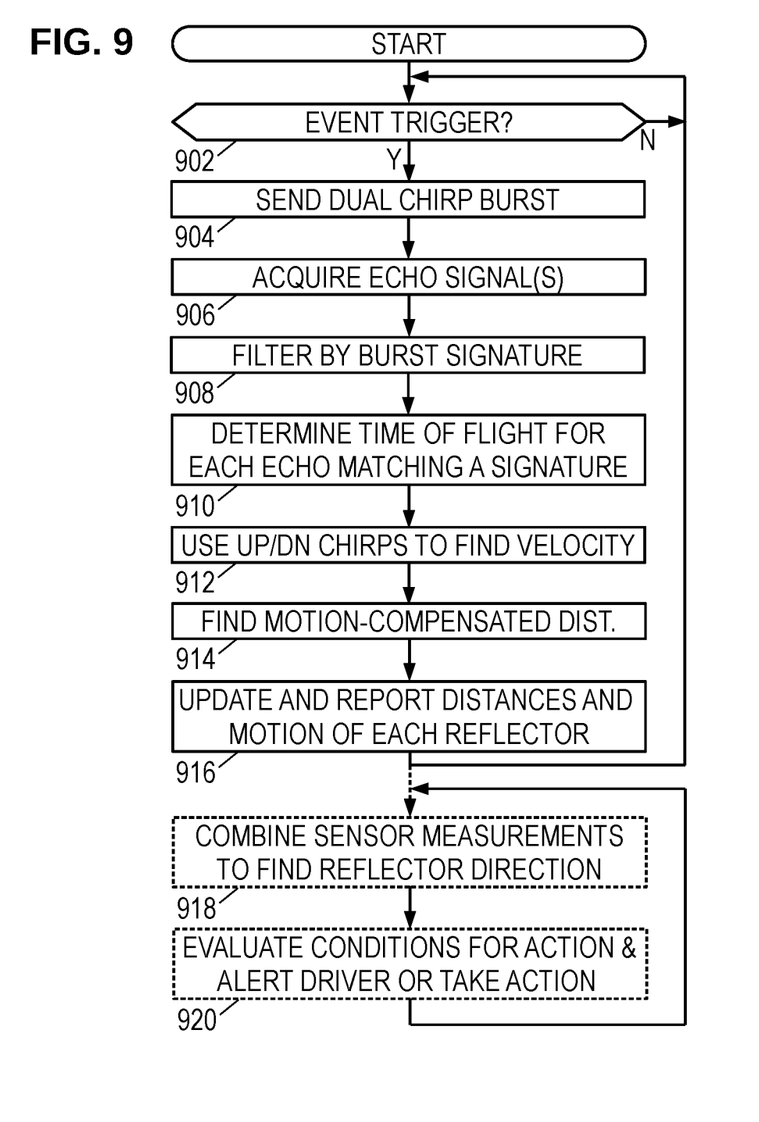
FIG. 9 is a flow diagram for an illustrative sensing method.

FIG. 9 is a flow diagram for an illustrative sensing method. It begins in block 902 with the control logic or interface detecting a measurement command or other indication that a measurement should be made. In block 904, the sensor transmits a multi-chirp burst as described previously, and opens a measurement window by asserting an enable signal. In block 906, the sensor acquires a receive signal potentially including echoes of the multi-chirp burst. In block 908, the sensor filters the receive signals to detect echoes having the proper burst signatures. In block 910, the sensor determines the time of flight for echoes with the proper burst signatures. In block 912, the sensor combines measured time-of-flight for an up-chirp and down-chirp to obtain a time shift or estimated velocity. In block 914, the sensor uses the time shift or otherwise combines the up- and down-chirp time of flight measurements to determine a motion-compensated distance measurement, optionally combining multiple measurements to increase measurement accuracy. In block 916, the sensor uses the most recent measurements to update register values regarding the distance and motion of reflectors. The method flow returns to block 902, but the measurements are conveyed to the ECU or other system controller, which in block 918 uses measurements from multiple sensors to determine the reflector's direction. Note that the multiple sensors may be of different types. For example, the acoustic sensor measurements may be combined with measurements from radar, lidar, and/or video, as well as position and motion sensors for the vehicle. In block 920, the controller evaluates the distances, direction, and relative motion of the targets to determine whether some action is needed, e.g., sounding an alert, driving a braking or steering actuator, or otherwise implementing the desired assisted driving feature.

The above paragraphs disclose, inter alia, the use of side bands to provide multi-channel coding for ultrasonic sensors, thereby achieving strong suppression of cross talk between sensors. Because separate frequency bands are used for measuring time of flight and encoding source identity, each sensor can achieve the same distance performance as a single-sensor system without any loss of resolution, providing all sensors with equal magnitudes and equivalent performance with respect to Doppler shift. This characteristic enables the system controller to reliably combine information from different sensors, improving the performance of the system as a whole.

Though the operations shown and described in FIG. 9 are treated as being sequential for explanatory purposes, in practice the method may be carried out by multiple integrated circuit components operating concurrently and perhaps even speculatively to enable out-of-order operations. The sequential discussion is not meant to be limiting. Moreover, the foregoing embodiments may omit complicating factors such as parasitic impedances, current-limiting resistors, level-shifters, line clamps, etc., which may be present but do not meaningfully impact the operation of the disclosed circuits. Still further, the focus of the foregoing discussions has been ultrasonic sensors, but the principles are applicable to any acoustic sensors or other pulse-echo transducers that may potentially interfere with each other if operated in parallel. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. An acoustic sensing method that comprises:
   driving an acoustic transducer to send acoustic bursts each including an up-chirp in a first frequency band and a down-chirp in a second frequency band;
   receiving echo signals responsive to the acoustic bursts from the transducer; and
   using the echo signals to determine a distance or time of flight from the transducer.

2. The acoustic sensing method of claim 1, wherein each of the acoustic bursts includes the up-chirp superimposed with the down-chirp.

3. The acoustic sensing method of claim 1, wherein the first and second frequency bands are non-overlapping.

4. The acoustic sensing method of claim 1, wherein the acoustic transducer supports multiple options for at least one of the first and second frequency bands to provide a source-specific signature for the acoustic bursts that enables self-generated echo signals to be distinguished from echo signals concurrently generated from other sources.

5. The acoustic sensing method of claim 4, wherein the first frequency band is a center band supported by the acoustic transducer, and wherein the second frequency band is an upper band or a lower band supported by the acoustic transducer.

6. The acoustic sensing method of claim 5, wherein said using includes:
   correlating the echo signals with a center band up-chirp and at least one of a lower band down-chirp and an upper band down-chirp;
   detecting arrival times associated with up-chirp and down-chirp correlation peaks; and
   combining the arrival times to estimate a Doppler shift or relative velocity of a target.

7. The acoustic sensing method of claim 6, wherein said using further includes adjusting the arrival time associated with the up-chirp based on the Doppler shift or relative velocity of the target.

8. An acoustic sensing method that comprises:
   driving an acoustic transducer to send acoustic bursts each including a concurrent up-chirp and down-chirp;
   receiving echo signals responsive to the acoustic bursts from the transducer; and
   using the echo signals to determine a distance or time of flight from the transducer.

9. The acoustic sensing method of claim 8, wherein the up-chirp is sent in a first frequency band and the down-chirp is sent in a second frequency band.

10. The acoustic sensing method of claim 8, wherein said using includes:
    correlating the echo signals with an up-chirp and with a down-chirp;
    detecting arrival times associated with up-chirp and down-chirp correlation peaks; and
    combining the arrival times to estimate a Doppler shift or relative velocity of a target.

11. The acoustic sensing method of claim 10, wherein said using further includes adjusting the arrival time associated with the up-chirp based on the Doppler shift or relative velocity of the target.

12. A sensor controller comprising:
    a transmitter configured to couple to an acoustic transducer to send acoustic bursts each including an up-chirp in a first frequency band and a down-chirp in a second frequency band;
    a receiver configured to couple to the acoustic transducer to receive echo signals responsive to the acoustic bursts; and
    a processor configured to derive a distance or time of flight from the echo signals.

13. The sensor controller of claim 10, wherein each of the acoustic bursts includes the up-chirp superimposed with the down-chirp.

14. The sensor controller of claim 10, wherein the first and second frequency bands are non-overlapping.

15. The sensor controller of claim 10, wherein the sensor controller is configured to support multiple options for at least one of the first and second frequency bands to provide a sensor-specific signature for the acoustic bursts that enables self-generated echo signals to be distinguished from echo signals concurrently generated from other sensors.

16. The sensor controller of claim 15, wherein the first frequency band is a center band supported by the acoustic transducer, and wherein the second frequency band is an upper band or a lower band supported by the acoustic transducer, wherein said processor is configured to derive the distance or time of flight by:
    correlating the echo signals with a center band up-chirp and at least one of a lower band down-chirp and an upper band down-chirp;
    detecting arrival times associated with up-chirp and down-chirp correlation peaks;
    combining the arrival times to estimate a Doppler shift or relative velocity of a target; and adjusting the arrival time associated with the up-chirp based on the Doppler shift or relative velocity of the target.

17. A sensor controller comprising:
a transmitter configured to drive an acoustic transducer to send acoustic bursts each including a concurrent up-chirp and down-chirp;
a receiver configured to couple to the acoustic transducer to receive echo signals responsive to the acoustic bursts; and
a processor configured to operate on the echo signals to determine a distance or time of flight from the transducer.

18. The sensor controller of claim 17, wherein the up-chirp is sent in a first frequency band and the down-chirp is sent in a second frequency band.

19. The sensor controller of claim 17, wherein said processor is configured to determine the distance or time of flight by:
correlating the echo signals with an up-chirp and with a down-chirp;
detecting arrival times associated with up-chirp and down-chirp correlation peaks;
combining the arrival times to estimate a Doppler shift or relative velocity of a target; and
adjusting the arrival time associated with the up-chirp based on the Doppler shift or relative velocity of the target.

20. The sensor controller of claim 17, wherein as part of operating on the echo signals, said processor is configured to derive a Doppler shift estimate from the echo signals.

* * * * *